April 10, 1951 H. W. HOARD 2,548,371

JUNCTION BLOCK

Filed May 14, 1948 2 Sheets-Sheet 1

Inventor
Halbert W. Hoard
By Ira Milton Jones
Attorney

Inventor
Halbert W. Hoard
By Ira Milton Jones
Attorney

Patented Apr. 10, 1951 2,548,371

UNITED STATES PATENT OFFICE 2,548,371

JUNCTION BLOCK

Halbert W. Hoard, Milwaukee, Wis.

Application May 14, 1948, Serial No. 26,956

6 Claims. (Cl. 173—338)

This invention relates to junction blocks for use in electrical wiring harnesses and has as an object the provision of a simple, inexpensive device for enclosing a number of connections between conductor wires and retaining said connections separated and electrically insulated from each other.

More specifically it is an object of this invention to provide a junction block having one or more small cavities or pockets connected with a large central cavity by narrow restricted passages wide enough to permit wires to pass therethrough but too narrow to permit the passage of the enlargements formed by mechanically and electrically connecting the wires, so that by placing each of said connections in one of the small cavities with the wires passing through the restricted passages the connections are held in position and isolated and insulated from each other and other instrumentalities in the junction block.

Another object of this invention is to provide a junction block of the character described which incorporates a socket for the reception of the prongs of an electric cord plug.

Another object of this invention is to provide a junction block adapted to have a socket receptacle incorporated therein if desired but which may be omitted where unnecessary.

Still another object of this invention is to provide a junction block equipped with one or more removable inserts each of which carries a set of socket terminals for coaction with the prongs of an electric cord plug.

A further object of this invention is to provide a junction block having additional wire entry ports and socket prong inlets initially closed by frangible wall portions which may be easily broken away when necessary.

With the above and other objects in view, which will appear as the description proceeds, this invention resides in the novel method and procedure substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which.

Figures 1, 2:
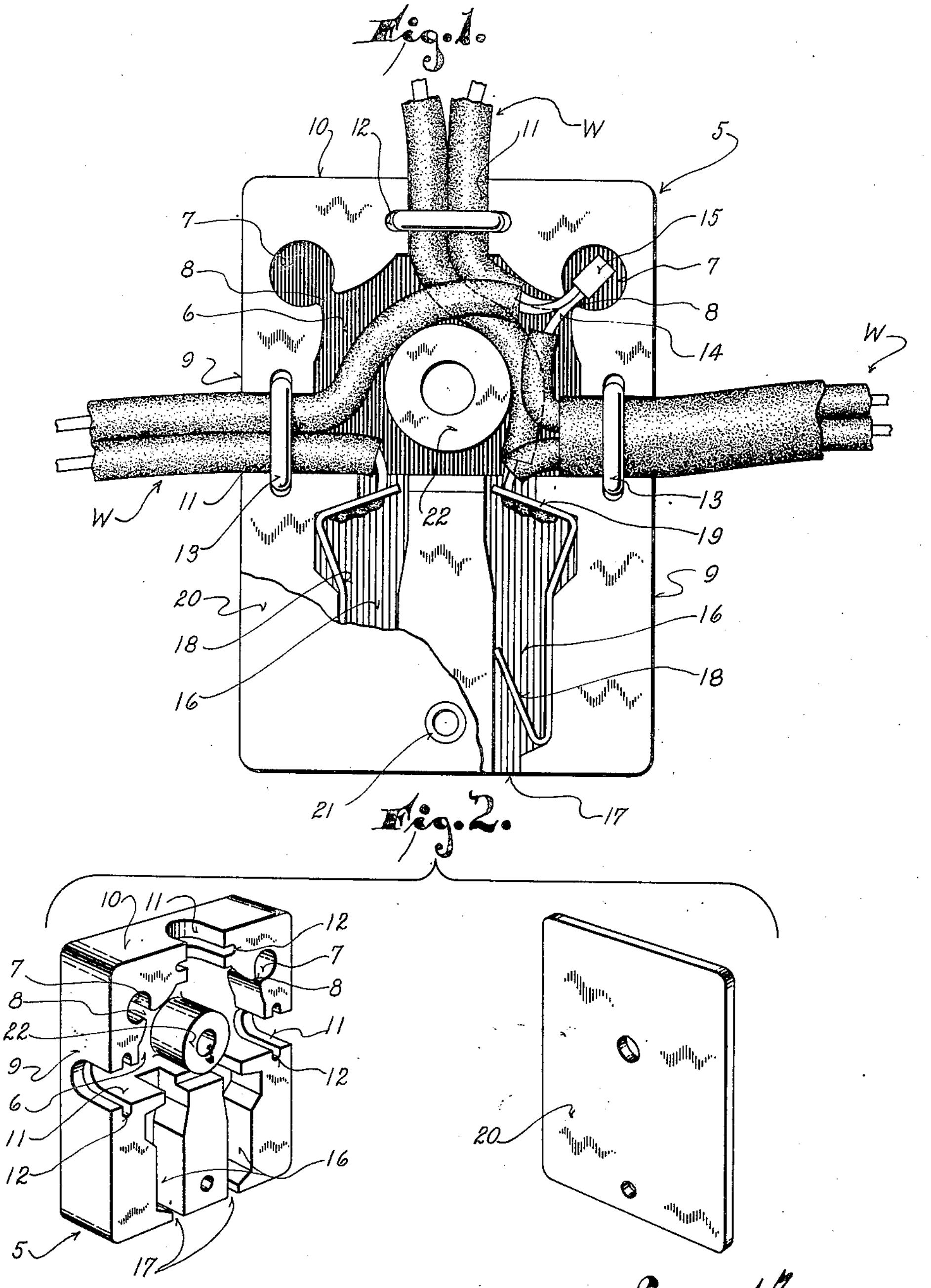
Figure 1 is a plan view of a junction block embodying this invention and illustrating the same with the cover thereof partially broken away.
Figure 2 is a perspective view of the body portion and cover of the block shown in Figure 1.
Figure 3:
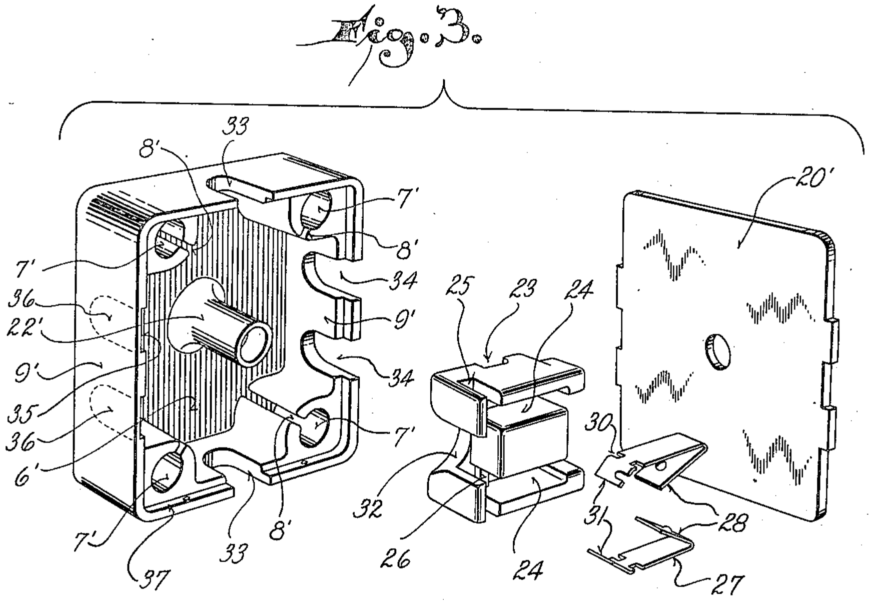
Figure 3 is a perspective view similar to Figure 2 but illustrating a modified embodiment of the invention.

Referring now particularly to the accompanying drawings the numeral 5 designates a block of electrically insulating material, preferably a thermosetting plastic, having the main central cavity 6 opening to the top face thereof. At two corners of this cavity are smaller cavities or pockets 7 also opening to the top face of the block and connected with the main central cavity 6 by restricted passages 8.

The side walls 9 and the end wall 10 of the cavity 6 have openings 11 providing entry ports for conductor wires "W." Grooves 12 in the walls of the openings 11 are provided to receive anchor rings 13 which grip the wires. In this manner the wires are anchored against displacement and their end portions received within the cavity are free from strains that might be imposed thereon by a pull upon the wires.

The ends of the wires to be connected are bared as at 14 and then mechanically and electrically connected in any suitable manner. Preferably, however, the connection of these ends is effected by metal band-like units 15 clinched about the end portions of the wires on a clinching machine (not shown) but well known to those skilled in the art of producing electrical wiring harnesses.

These connector units 15, and for that matter any secure connection of the ends of the wires, provide enlargements of a size which will not pass through the restricted necks or passages 8 but will be received in the small cavities or pockets 7. Hence, after the connections are made and upon insertion thereof into pockets 7 with the adjacent portions of the wires passing through the restricted necks or passages 8, the connections so placed are held against displacement, and electrically insulated and isolated from each other and other instrumentalities contained within the central cavity.

The end portion of the block opposite the end wall 10 has two separated passages or chambers 16 opening to the adjacent end of the block through ports 17. These chambers 16 are shaped to receive terminals 18 adapted for coaction with the prongs of an electric cord plug (not shown) inserted through the ports 17. The terminals 18 are electrically connected with the appropriate conductor wires as at 19.

A cover 20 holds all of the instrumentalities, that is, the connections 15 and the terminals 18 together with the wires attached thereto, in the block. This cover may be secured by means of an eyelet rivet 21 and a fastening screw (not shown) passing through the cover and a hollow post 22 which rises up from the bottom of the main cavity 6. The fastening screw also provides means for securing the block to a support, and when withdrawn allows the cover to be swung about the eyelet rivet 21 to expose the contents of the block as will be readily apparent.

In that form of the invention shown in Figures 3 to 6 inclusive the main central cavity 6′ substantially encompasses the entire block except for the corner portions thereof which define the smaller cavities or pockets 7′ and which are connected with the main central cavity through restricted necks or passages 8′.

Figure 4:
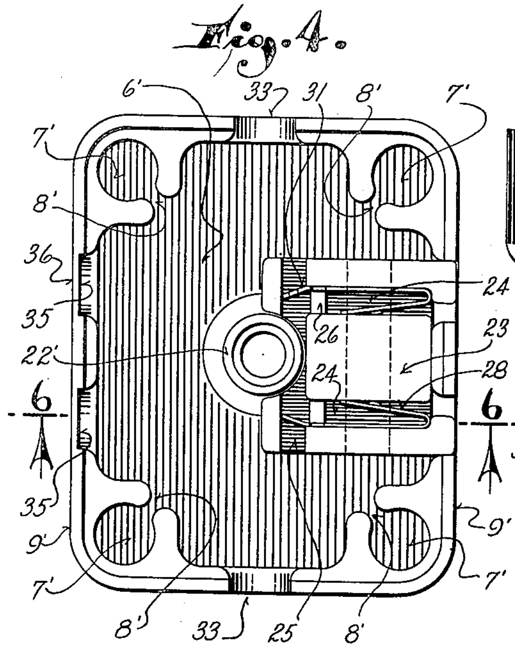
Figure 4 is a plan view of the construction shown in Figure 3 with the cover removed.
Figure 5:
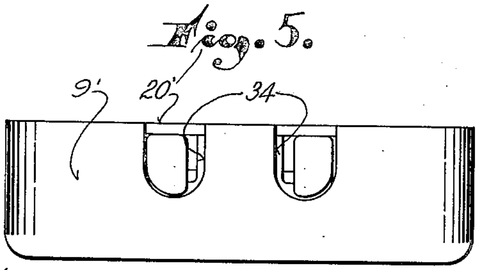
Figure 5 is an end view thereof.
Figure 6:
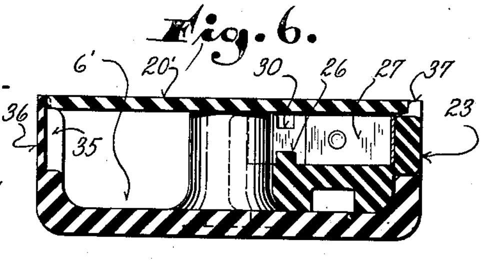
Figure 6 is a cross sectional view through Figure 4 on the plane of the line 6—6.

In this embodiment of the invention an insert 23 of electrically insulating material is removably positioned within the central cavity 6′ as shown in Figure 4, either at one or the other side of the hollow center post 22′. This insert 23 is formed to provide spaced parallel chambers 24 which open to that end of the insert positionable against the side walls 9′ of the body. These parallel chambers also open to a cross slot 25 at the opposite end of the insert. Small lugs 26 extending across the chambers 24 at their junction with the slot 25 provide means for holding terminals 27 in position. The terminals have spring ends 28 for coaction with the prongs of a plug not shown and have notches 30 to engage over the lugs 26. Their end portions 31 provide means for electrically connecting the terminals to conductor wires not shown but within the cavity or chamber 6′.

The insert is held against displacement excepting upward removal from the cavity by interengaging with the adjacent side wall 9′ and the post 22′ and for this purpose the inner end of the insert has a round bottomed socket 32 of a size to fit the post. The insert may be positioned at either side of the post or if desired two inserts may be placed end to end, one at each side of the post.

Preferably the block is provided with wire entry ports 33 in the end walls of the block and with ports 34 in one of the side walls 9′ to permit the insertion of the prongs of a plug. The opposite side wall 9′ has similar ports defined therein by sockets 35 but initially closed by a thin, frangible wall 36 which is easily broken away to accommodate two cord plugs.

As in the embodiment previously described the securement of a cover 20′ over the open face of the block or body holds the connected wires and inserts in place, and in this case the cover is held against shifting by being recessed within the stepped marginal edge 37 of the body and held in place by a fastening screw (not shown) passing through it and the hollow post 22′.

Though the cavity 6 in the body or block 5 has been defined as opening to the top face of the block and the hollow post 22 as rising from the bottom of the cavity it should be understood that such reference to top and bottom is only for convenience in description and that when the block is in use it is mounted with the cover against the supporting surface so that actually the covered "open top" of the cavity may be at the bottom.

From the foregoing description taken in connection with the accompanying drawing it will be readily apparent to those skilled in the art that this invention provides a junction block well adapted for use with electrical wiring harnesses and that it readily adapts itself to a wide variety of uses and effectively holds the various connected wire ends electrically insulated from each other and thus obviates the need for individually covering each connection with tape or other insulation.

What I claim as my invention is:

1. A junction block of the character described, comprising: a body of insulative material having a flat bottom and upright side walls defining a cavity open at the top, certain of said side walls having entry ports through which conductor wires may enter the cavity; partition walls in said cavity defining a pair of side-by-side chambers communicating with the cavity and in line with other entry ports through which the prongs of a plug may enter said chambers; socket terminals removably seated in the side-by-side chambers in position to be engaged by the prongs of a plug inserted through said last named ports; partition walls in said cavity cooperating with certain of the upright side walls to form pockets which open to the top of the body and communicate with the cavity through narrow passages so that connections between conductor wires may be placed in the pockets with the wires passing through the narrow passages, said pockets and said passages having a depth equal to the adjacent portion of the cavity; a hollow boss extending upwardly from the bottom of the cavity; and a removable cover resting upon the top of the partition wall in the cavity to thereby close the tops of said chambers and pockets and confine the socket terminals in their respective chambers and the wire connections in the pockets, said cover having a hole therethrough in alignment with the hollow boss whereby a single fastening means may be passed through the cover and the hollow post to hold the cover in place and mount the block upon a support.

2. In a junction block of the character described: a body of insulative material having a pair of opposite faces which are parallel to one another and side walls perpendicular to said faces, said body having a cavity opening to one face thereof and having entry ports in one of said side walls through which the prongs of a connector plug may be inserted into said cavity, said body also having pockets at certain of its corners opening to said face of the body and connected with the cavity through narrow passages, said pockets and said passages having a depth equal to that of said cavity; a block of insulating material removably disposed in said cavity with one part of said block abutting said one wall and another part of said block cooperating with a part on the body extending into the cavity, said block having a face coplanar with said one face of the body and chambers opening to said face and communicating with said entry ports; and a connector plug socket removably received in each of said chambers and adapted to be engaged by the prong of a plug inserted through said ports.

3. A junction block for use in electric wiring harnesses and the like, comprising: a body of electrically insulating material of polygonal shape having corners and flat sides including a pair of opposite parallel faces, said body having a cavity of uniform depth opening to one of said faces and entry ports in certain of its side walls through which conductor wires may enter the cavity, one of the side walls of the cavity having entry ports through which the prongs of a plug may enter the cavity; socket terminals readily removably disposed in chambers in said body opening to said face thereof, said chambers being of less depth than said cavity and being communicated with said cavity and said entry ports and holding the socket terminals in position to be engaged by the prongs of a plug inserted into said last named ports; said body having pockets at certain of its corners opening to said face of the body and connected with the cavity through narrow passages, said pockets and said passages having a depth equal to that of said cavity and said pockets being spaced a substantial distance from said socket terminals so that upon placement of the connected ends of wires entering the cavity in said pockets, said connected ends of the wires are held against displacement and away from the socket terminals to which other wire ends may be secured; and a flat removable cover closing said one face of the block.

4. In a device of the character described: a body having a cavity opening to one face thereof and having ports in one of its side walls through which the prongs of an electric cord plug may be inserted into the cavity; a post extending up from the bottom of the cavity substantially midway between said side wall and the opposite side wall, said opposite side wall having frangible portions adapted to be readily broken away to provide ports similar to those in the first named side wall; an insert readily removably positioned between either of said side walls and said post, said insert having one end thereof shaped to partially embrace the post and the opposite end thereof shaped to fit against the inner face of the adjacent side wall of the cavity; and socket terminals carried by said insert and adapted to have conductor wires attached thereto inside the cavity.

5. In a junction block for use with electrical wiring harnesses and the like: a body of electrically insulating material having a cavity opening to one face thereof and having openings in one of the side walls thereof through which the prongs of an electric cord plug may be inserted into the cavity; a hollow post extending up from the bottom of the cavity at a distance in from said side wall; an insert removably positioned in the space between said post and said side wall and having its portions which engage the hollow post and said side wall shaped to coact therewith in holding the same against displacement except upward removal through the open top of the cavity; socket terminals carried by said insert and adapted to be engaged by the prongs of an electric cord plug, said terminals being connectible within the cavity to conductor wires; and a cover closing the open top of the cavity and extending across the insert and the top of the post so that a fastening screw extending through the cover and post may serve to hold the cover in place and mount the entire body to a support.

6. In a junction block of the character described: a body of insulative material having a flat bottom wall and upright side walls, said body having a cavity of uniform depth open at the top and having entry ports in certain of its side walls through which conductor wires may enter the cavity; walls in said cavity defining a pair of side-by-side chambers communicating with the cavity and in line with other entry ports through which the prongs of a plug may enter said chambers; socket terminals readily removably disposed in said chambers, said chambers holding the socket terminals in position to be engaged by the prongs of a plug inserted through said last named ports; said body having pockets adjacent to certain of its upright side walls which pockets open to the top of the body and communicate with the cavity through narrow passages, said pockets and said passages having a depth equal to that of said cavity; and a post-like projection extending up from the bottom of the cavity and disposed substantially centrally of said cavity, said post-like projection having a bore therethrough to accommodate a fastening means for mounting the block.

HALBERT W. HOARD.

REFERENCES CITED

The following references are of record in the file of this patent:

UNITED STATES PATENTS

| Number | Name | Date |
|---|---|---|
| 1,248,202 | Thomas | Nov. 27, 1917 |
| 2,028,367 | Wermine | Jan. 21, 1936 |
| 2,258,343 | Walker | Oct. 7, 1941 |
| 2,440,924 | Benander | May 4, 1948 |

FOREIGN PATENTS

| Number | Country | Date |
|---|---|---|
| 166,615 | England | July 18, 1921 |
| 175,418 | England | Feb. 23, 1922 |